United States Patent
Kudrin et al.

(10) Patent No.: US 11,055,115 B1
(45) Date of Patent: Jul. 6, 2021

(54) VIRTUAL MACHINE CONVERSION IN DISTRIBUTED SYSTEM OF REMOTE DESKTOPS

(71) Applicant: Parallels International GmbH, Schaffhausen (CH)

(72) Inventors: Maxim Kudrin, Moscow (RU); Ilya Bakaev, Moscow (RU); Bair Dymbrylov, Moscow (RU); Serguei Beloussov, Costa del Sol (SG); Nikolay Dobrovolskiy, Moscow (RU)

(73) Assignee: Parallels International GmbH, Schaffausen (CH)

( * ) Notice: Subject to any disclaimer, the term of this patent is extended or adjusted under 35 U.S.C. 154(b) by 161 days.

(21) Appl. No.: 16/059,150

(22) Filed: Aug. 9, 2018

(51) Int. Cl.
G06F 9/455 (2018.01)
G06F 9/451 (2018.01)
G06F 9/445 (2018.01)
G06F 9/54 (2006.01)

(52) U.S. Cl.
CPC .......... *G06F 9/452* (2018.02); *G06F 9/44505* (2013.01); *G06F 9/45558* (2013.01); *G06F 9/545* (2013.01); *G06F 2009/45562* (2013.01); *G06F 2009/45595* (2013.01)

(58) Field of Classification Search
None
See application file for complete search history.

(56) References Cited

U.S. PATENT DOCUMENTS

| | | | | |
|---|---|---|---|---|
| 8,533,305 B1 * | 9/2013 | Keagy | ................ | G06F 9/45558 709/222 |
| 2007/0180448 A1 * | 8/2007 | Low | ..................... | G06F 3/1415 718/1 |
| 2010/0107113 A1 * | 4/2010 | Innes | .................. | G06F 16/1734 715/779 |
| 2011/0153697 A1 * | 6/2011 | Nickolov | .............. | G06F 9/4856 707/827 |
| 2011/0153781 A1 * | 6/2011 | Srinivas | .............. | G06F 3/04842 709/219 |
| 2015/0304455 A1 * | 10/2015 | Antony | ............. | H04L 29/08144 709/203 |
| 2016/0055017 A1 * | 2/2016 | Beveridge | ........... | G06F 9/45558 718/1 |
| 2016/0335108 A1 * | 11/2016 | Ryu | .................... | G06F 9/45558 |
| 2017/0262307 A1 * | 9/2017 | Venkatesh | ........... | G06F 16/1794 |
| 2018/0039640 A1 * | 2/2018 | St. Laurent | ......... | G06F 9/45558 |
| 2019/0340003 A1 * | 11/2019 | Ramanathan | ......... | G06F 16/128 |

FOREIGN PATENT DOCUMENTS

WO  WO-2007100942 A2 *  9/2007  ........... G06F 9/5077

* cited by examiner

*Primary Examiner* — Kenneth Tang
(74) *Attorney, Agent, or Firm* — Rosenberg, Klein & Lee (57) ABSTRACT

Disclosed are systems and methods for executing a remote session in a virtualized environment. The described technique may be used when handling a request to launch a remote session using a specified virtual template. A virtual machine (VM) type associated with the virtual template and that indicates hypervisor compatibility of the virtual template may be determined. A destination hypervisor is selected for executing the remote session. If VM type is not compatible for execution on the destination hypervisor, a converted, native VM image file is generated which is compatible with the destination hypervisor. The remote session is then launched on the destination hypervisor using another VM executed using the converted VM image file.

19 Claims, 5 Drawing Sheets

VIRTUAL MACHINE CONVERSION IN DISTRIBUTED SYSTEM OF REMOTE DESKTOPS

FIELD OF TECHNOLOGY

The present disclosure relates generally to the field of computer virtualization, more specifically, to systems and methods of executing remote sessions in different virtualized environments.

BACKGROUND

With virtual machine technology, a user can create and run multiple operating environments on a server at the same time. Each operating environment, or virtual machine, requires its own "guest" operating system (OS) and can run software applications independently from the other virtual machines. Virtual machine technology provides many benefits as it can lower information technology (IT) costs through increased efficiency, flexibility and responsiveness. Each virtual machine acts as a separate environment that reduces risks and allows developers to quickly recreate different OS configurations or compare versions of applications designed for different OSs. Additional customer uses for VMs include cloud services, targeted production server consolidation, hosting of legacy applications (older versions), and computer or server backup.

However, in the current marketplace, there are many different types of virtualization and different software vendors providing virtualization technology with lacks cross-compatibility. For example, an instance of a virtual machine may not be compatible with another hypervisor, even if the emulated virtual hardware is the same (e.g., x86 architecture). However, there may be situations in which a data center's computing needs are mismatched with the available computing resources, possibly allocated to a different virtualization platform. This limitation reduces the efficiency of a data center because the spare computing resources are left unused (therefore, wasted).

Accordingly, there is a need in the art for a system and method that addresses the need to support multiple types of virtualization, including virtual machines for different virtualization platforms which lack cross-compatibility.

SUMMARY

A system and method is disclosed herein for execution remote sessions using virtualized computing resources. The remote sessions may be implemented using a virtual desktop infrastructure (VDI) system in which a desktop operating system (OS) is executed and managed (e.g., as a virtual machine) on server(s) in a data center, and delivered to client devices as interactive desktops as if they were executing locally. The VDI system may be configured to support different types of hypervisors, for example, as provided by different vendors or software providers. As described herein, the VDI system may be configured to convert virtual machines (i.e., virtual templates) from one type to another, in order to work with different hypervisors in a single environment.

According to one exemplary aspect of the present disclosure, a computer-implemented method for executing a remote session in a virtualized environment is provided. The method includes receiving a request to launch a remote session using a specified virtual template, and determining a first virtual machine (VM) type associated with the virtual template. The first VM type indicates hypervisor compatibility of the virtual template. The method further includes selecting a destination hypervisor for executing the remote session, and responsive to determining that the first VM type is not compatible for execution on the destination hypervisor, generating, based on a first VM image file associated with the virtual template, a second VM image file having a second VM type that indicates compatibility with the destination hypervisor. The method includes launching the remote session using a second VM executed using the second VM image file.

In another aspects, generating the second VM image file further includes retrieving a first configuration file associated with the virtual template having the first VM type, wherein the first configuration file specifies one or more VM settings for the virtual template, and generating, based on the first configuration file, a second configuration file that is compatible with the destination hypervisor, wherein the VM settings are copied to and stored in the second configuration file in a format different than in the first configuration file.

In another aspect, generating the second VM image file further includes retrieving, from a VM management system, one or more VM settings associated with the virtual template using an application programming interface (API); and generating a destination configuration file that is compatible with the destination hypervisor using the one or more VM settings retrieved using the API.

In another aspect, the method further includes transferring the second VM image file from a first host to a second host executing the destination hypervisor, wherein the second VM is executed based on the second VM image file.

In another aspect, the method further includes registering the new configuration file and the second VM image file with the destination hypervisor.

In another aspect, the first VM image file is converted to the second VM image file while a virtual machine based on the first VM image file is in a running state.

In another aspect, the method includes, responsive to determining that the first VM image file has been previously transferred to a second hypervisor, generating a disk difference between the VMs representing a difference between formats of the first VM type and the second VM type.

According to another aspect, a system for executing a remote session in a virtualized environment is provided. The system includes a storage device configured to store a first virtual machine (VM) image file, and a hardware processor. The hardware processor is configured to receive a request to launch a remote session using a specified virtual template, and determine a first virtual machine (VM) type associated with the virtual template. The first VM type may indicate hypervisor compatibility of the virtual template. The hardware processor is further configured to select a destination hypervisor for executing the remote session, and responsive to determining that the first VM type is not compatible for execution on the destination hypervisor, generate, based on the first VM image file associated with the virtual template, a second VM image file having a second VM type that indicates compatibility with the destination hypervisor. The hardware processor is further configured to launch the remote session using a second VM executed using the second VM image file.

According to another exemplary aspect, a computer-readable medium is provided comprising instructions that comprises computer executable instructions for performing any of the methods disclosed herein.

The above simplified summary of example aspects serves to provide a basic understanding of the present disclosure.

This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplarily pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Exemplary aspects are described herein in the context of a system, method, and computer program product for executing remote sessions in a virtualized environment. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

Figure 1:
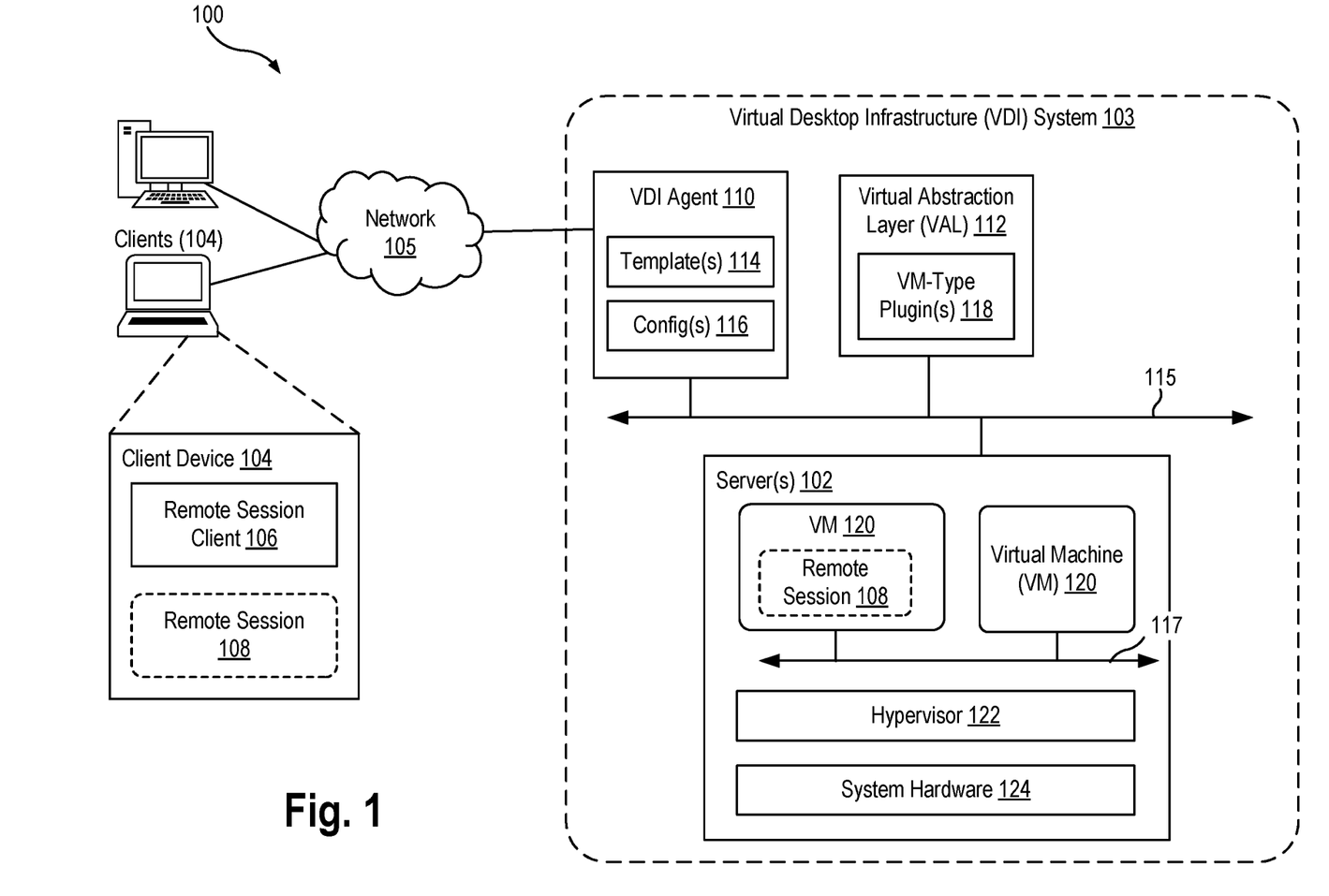
FIG. 1 is a block diagram illustrating a system for executing remote sessions in a virtualized environment according to an exemplary aspect.

FIG. 1 is a block diagram illustrating a system 100 for executing a remote session in a virtualized environment according to an exemplary aspect. The system 100 may be a distributed system that includes one or more client devices 104 communicatively connected to a virtual desktop infrastructure (VDI) system 103, having one or more servers 102, via a network 105.

The client devices 104 and/or servers 102 of the virtual desktop infrastructure 103 may be any computing device, physical server, computer server, desktop, laptop, handheld device, tablet device, smartphone, or any other electronic device as described herein. The network connection between the client device(s) 104 and the components of the virtual desktop infrastructure 103 may be a network socket, or other more complex communication channel. In some aspects, the network 105 may include, for example, the Internet, intranets, extranets, wide area networks (WANs), local area networks (LANs), wired networks, wireless networks, or other suitable networks, etc., or any combination of two or more such networks. For example, such networks may comprise satellite networks, cable networks, Ethernet networks, and other types of networks.

The client device 104 may include a remote session client 106 configured to establish a remote session 108 with a VDI agent 110 of the VDI system 103. In one aspect, the VDI system 103 may be a virtual application and desktop delivery system that allows users to access and use applications and data from any device, such as the client device 104. In some aspects, the remote session client 106 is a software application that establishes the remote session 108 as a connection to a new instance of a virtual desktop (e.g., a virtual machine) spawned by the VDI system 103 specifically for a remote session 108. The remote session 108 allows access to a user's data and applications (e.g., via a roaming profile). The remote session 108 is further depicted on the client device in FIG. 1 to represent its rendering and display on a local display device of the client device 104. An example of a remote session client 106 may be a Parallels® RAS Client (Remote Application Server™ Client) software application. In some aspects, the VDI agent 110 may provide a virtual desktop environment, sometimes referred to as a virtual desktop infrastructure (VDI) for executing applications and accessing data (e.g., private files). In some aspects, the remote session 108 may be implemented using a remote desktop protocol, such as Remote Desktop Protocol (RDP), Virtual Network Computing (VNC), or Personal Computer over Internet Protocol (PCoIP). In other aspects, the remote session client 106 may be a remote access application that establishes the remote session 108 as a remote desktop connection to a specific computing device (having a remote session agent executing thereon), such as the user's desktop at their office, server, or virtual machine. Example of remote access applications include Parallels Access® (formerly Parallels Mobile), Apple Remote Desktop™, Citrix GoToMyPC®, and Virtual Network Computing (VNC®).

In one aspect, the virtual desktop infrastructure system 103 includes one or more servers 102 for executing components of the virtual desktop infrastructure and its components, including at least one VDI agent 110 and a virtual abstraction layer 112. In the aspect shown, the components of the VDI system 103, including the VDI agent 110, the virtual abstraction layer 112, and the hypervisors 122, may be communicatively connected by an internal network, sometimes referred to as a management network 115.

The server(s) 102 (also referred to as host(s)) generally includes one or more virtual machines 120 that can be created on a host platform that includes system hardware 124, a host operating system, and a hypervisor 122 (also known as a virtual machine monitor or a virtualizer). The hypervisor 122 provides a guest operating system of the virtual machine 120 with a virtual operating platform and manages execution of the guest OS. The hypervisor 122 may run directly on the underlying system hardware 124 as an application or component running within a host operating system installed on the system hardware 124. Exemplary operations of the hypervisor 122 in various configurations are described in greater detail in U.S. Pat. No. 7,865,893 B1, "System and Method for Starting Virtual Machine Monitor in Common with Already Installed Operating System", which is incorporated herein by reference in its entirety.

The server 102 may be any computing device, physical server, computer server, desktop, laptop, handheld device, tablet device, smartphone, or any other electronic device suitable for implementing virtualization as described herein. The system hardware 124 of a host can include at least one computer processing unit (CPU), memory (e.g., random access memory), and storage devices (e.g., hard disk drives). The server 102 may include additional devices, software modules, and the like, as would be appreciated to one skilled in the art, but are not shown herein so as to not unnecessarily obscure the aspects of the disclosure. As software, the code for the VM 120 will typically execute on the actual system hardware 124. In the exemplary aspect, the virtual machine 120 has both virtual system hardware and guest system software, including the guest OS. The virtual system hardware can include a virtual CPU, virtual memory, a virtual disk, as well as other virtual hardware components, such as a virtual network interface. It is noted that all of the virtual hardware components of the virtual machine 120 can be implemented in software to emulate corresponding physical components, for example, using a virtual device emulator module.

In some aspects, each virtual machine 120 executing on the server 102 may have a guest agent installed in the guest operating system of the virtual machine. In a further aspect, each VM 120 within the VDI system 103 may be communicatively connected to the network 105 by a data network 117, which provides communications between the VMs and the outside network 105.

In general, it should be appreciated that the disclosed system and method is described herein in the context of a hosted virtualized computing system. However, in alternative aspects, the system and method may be implemented for a non-hosted virtualized computer system, and may also be implemented directly in a computer's primary OS, both where the OS is designed to support virtual machines and where the OS does not support virtual machines.

The VDI agent 110 (e.g., executing as a service application or virtual appliance) is configured to provide an interface for managing a hypervisor 122. The VDI agent 110 may be configured to manage one or more virtual templates 114 and configurations 116 associated with each corresponding virtual template 114. A virtual template 114 refers to a virtual machine having pre-determined configurations, such as resource allocation (e.g., 2.9 Ghz CPU, 4 GB of RAM), pre-installed guest applications, and even a particular execution state. The virtual template 114 may be implemented as a pre-determined virtual machine image file which may include one or more configurations 116 associated with the virtual template. A VM image file may be a single file or a set of files which are packaged in a format operable by a particular hypervisor. By way of example, a VM image file may be formatted according to the Open Virtualization Format (OVF) designated for packaging and distributing virtual appliances or software to be executed in VMs.

Among the servers 102 of the VDI system 103, there may be different types of virtualization systems that can be installed on different types of hardware platforms 124 of the servers 102. A virtualization type (also interchangeably referred to as a VM type) indicates compatibility with a particular virtualization technology or hypervisor. By way of example, a virtualization type may refer to different types of virtualization, such as a type of full virtualization implemented by a hypervisor that executes directly on the hardware platform to control the hardware and manage guest operating systems (also referred to as native or bare-metal virtualization); or a type of full "hosted" virtualization in which a hypervisor runs on a host operating system similar to other processes on the host. In another example, a virtualization type may indicate operating-system-level virtualization where all virtual instances (sometimes referred to as "containers") share a single operating system kernel but are isolated from each other using resource isolation features that are built into the OS kernel itself. In another aspect, the virtualization type can be used to distinguish between different virtualization technologies provided by different software vendors, such as VMs configured according to technologies provided by Microsoft Hyper-V® and other VMs configured according to technologies made available by VMware ESXi®. It is understood that VMs from a particular virtualization type may lack cross-compatibility, that is, are incompatible to be managed by a hypervisor of a different virtualization type. For example, a Hyper-V VM stored on one server cannot be natively executed by an ESXi hypervisor on another server.

According to aspects of the present disclosure, the virtual abstraction layer (VAL) 112 is configured to coordinate with the VDI agent 110 to manage different types of virtual machines. In one aspect, the virtual abstraction layer 112 may be configured to perform a variety of functions, including (i) the processing of actions related to VM management, such as creating, cloning, deleting a VM, etc., after receiving a request from the VDI agent 110; and (ii) the processing of actions with specific hypervisors 122.

Using the virtual abstraction layer 112, the VDI agent 110 is configured to create a heterogeneous environment by adding various hypervisors. In one implementation, the virtual abstraction layer 112 may be configured to provide support for certain virtualization systems using a plugin-based architecture. As shown in FIG. 1, the virtual abstraction layer 112 may include one or more VM-type plugins 118, which are software components having a corresponding VM-type and configured to provide the virtual abstraction layer 112 with functionality for how to convert a virtual template to a particular VM-type. In one aspect, the VM-type plugin 118 may specify a mapping for arranging configurations 116 into a format compatible with the target VM-type.

Figure 2A:
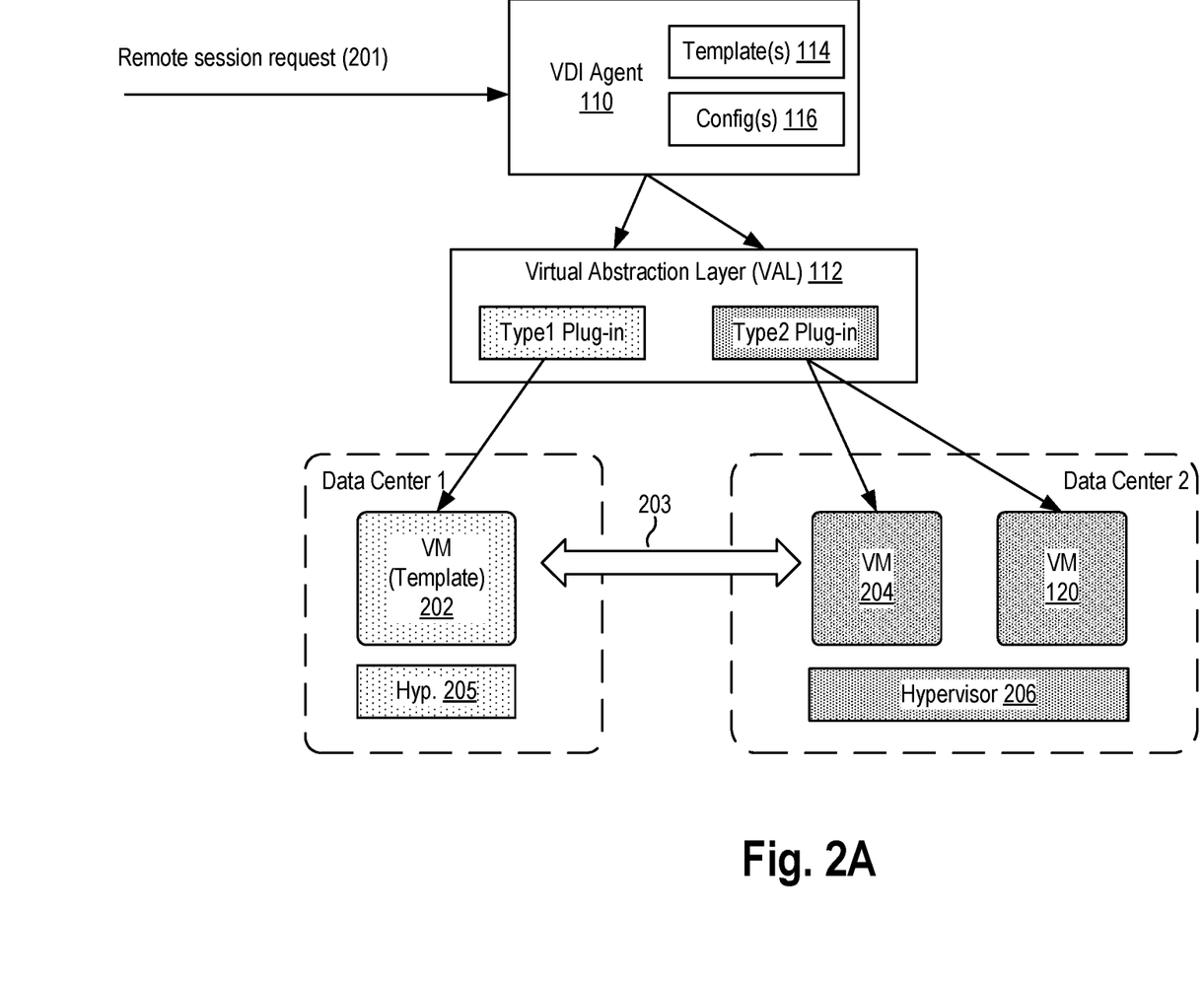
FIG. 2A and FIG. 2B are block diagrams illustrating operations of the system of FIG. 1 according to an exemplary aspect.
Figure 2B:
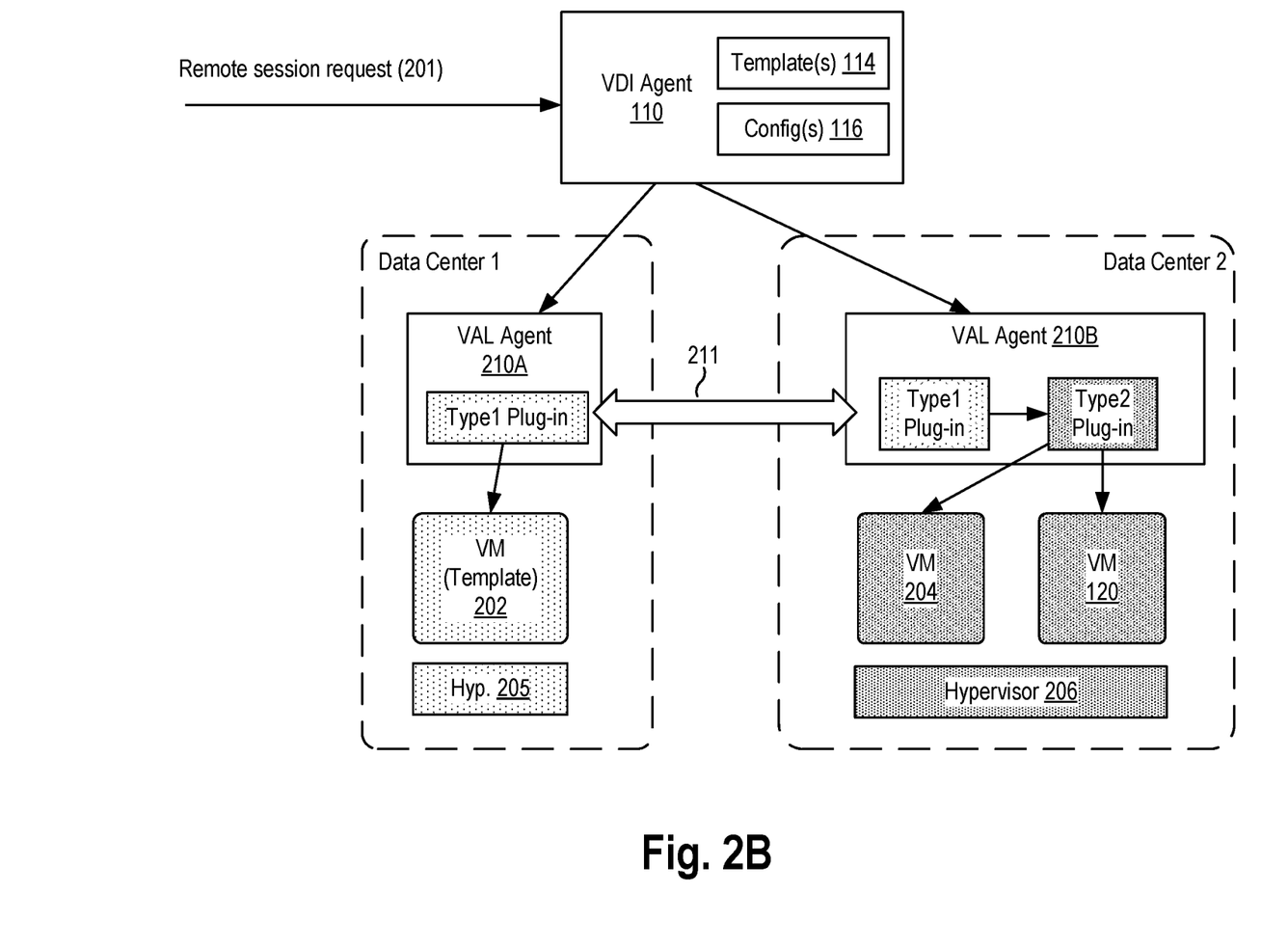

FIGS. 2A and 2B are block diagrams illustrating operations of the system of FIG. 1 according to an exemplary aspect. As shown in FIG. 2A, the VDI agent 110 may receive a request 201 to launch a remote session 108 using a specified virtual template 114. The VDI agent 110, in turn, directs the virtual abstraction layer 112 to instantiate a VM associated with the template 114 within a server 102 in the VDI system 103.

In the aspect shown, there may be a single base image 202 of a VM in one data center or virtualized host (depicted as "Data Center 1" in FIG. 2A), which can be converted and delivered to another data center or virtualized host (e.g., "Data Center 2") with the assistance of the virtual abstraction layer 112. In one example, the base image of the VM can be spread to different data centers based on different virtualization technologies. In the aspect shown, the first data center or server 102 may be executing a hypervisor having a first VM-type, which is incompatible with the hypervisor running in the second data center or server (and associated with a second VM type). In one aspect, each data center may be a homogeneous virtual execution environment with respect to the VM type, i.e., all servers and all hypervisors in that data center have the same VM-type. In another aspect, a data center can be a heterogeneous virtual execution environment with respects to VM type, i.e., at least one server and/or hypervisor having a different VM-type than another server or hypervisor in that data center. VMs and hypervisors having same/different VM types are graphically depicted in FIG. 2A using same/different background patterns.

The virtual abstraction layer 112 may classify or determine the VM type of the virtual template that indicates which hypervisors are compatible with the virtual template. In some aspects, the VM type of the virtual template may be specified in a configuration file associated with the virtual template. In other aspects, the VM type of the source VM may be specified in a central database maintained pertaining to the VMs of the VDI system 103.

The virtual abstraction layer 112 may select a destination hypervisor 206 for executing the requested remote session 108. The selection of the destination hypervisor 206 may be performed based on a determination of which server has the most available computing resources, or by using other techniques for scheduling or load balancing. If the destination hypervisor 206 is determined to be incompatible with the virtual template, then the virtual abstraction layer 112 may perform a conversion process that creates a corresponding VM image file, among other files, that is native to the destination hypervisor 206. In one aspect, the virtual abstraction layer 112 may transmit and convert a configuration file of the VM or running VM (e.g., configurations 116), which are used for the configuration of the final, destination VM.

Finally, the virtual abstraction layer 112 is configured to launch the remote session using a destination VM 204 executed using the converted VM image file. In one aspect, the virtual abstraction layer 112 may create a virtual machine from an image (transferred in a foreign format for the destination hypervisor) and applies the settings, applications (e.g., from an additional file), to the destination VM 204. The information about the VM (e.g., memory, CPU) may also be stored in an abstract manner, rather than be bound in a particular non-cross-compatible format. In this case, the virtual abstraction layer 112 may analyze a VM-management API, as described later, and convert this information into configuration files for the targeted hypervisor.

In one example, the virtual abstraction layer 112 may read the configuration file and/or settings of a VM from one hypervisor having a first VM type (say, an ESX-type VM). The virtual abstraction layer 112 may translate the retrieved configurations into its equivalent configuration file(s) and settings of another hypervisor (e.g., a HyperV-type VM). The virtual abstraction layer 112 may then convert the virtual disk of the template 114 from the first VM type to the second VM type. The virtual abstraction layer 112 may further register the newly created configuration file(s) and settings, and virtual disk, on the destination hypervisor. It is noted that this process of converting the base virtual template to a different VM-type may be performed on a running VM, as well as a stopped VM.

In some aspects, the virtual abstraction layer 112, as part of the conversion process of the VM, may retrieve configurations 116 (e.g., configuration file) associated with the virtual template 114 that specifies one or more VM settings for the virtual template. Examples of VM settings that may be found in the configuration 116 include: a display name used to identify the virtual machine; an amount of memory allocated to the virtual machine; the guest operating system installed in the virtual template; a reference (e.g., file path) to the virtual disk(s) for the virtual machine; a network address (e.g., IP address) to be assigned to the virtual machine for the data network 117; and other settings.

The virtual abstraction layer 112 may then generate, based on the configurations for the virtual template 114, a native (second) configuration file that is compatible with the destination hypervisor 206. In some implementations, the VM settings are copied to and stored in the second configuration file in a format different than in the original configuration file. For example, the virtual abstraction layer 112 may extract the memory allocation setting from the original vmx configuration file, in a line containing the "memsize" parameter (e.g., "memsize=512") and generate an XML file having the extracted memory allocation setting value in the appropriate field, as determined using the VM-Type-2 plugin. In another example, the virtual abstraction layer 112 may extract data values from an original configuration file that is an XML file according to the first VM type's specification and re-write the data values to a converted configuration file in another format (or even according to a different XML specification) required by the second VM type. In some aspects, the virtual abstraction layer 112 may break up the original configuration file into multiple config files as required by a second VM type (i.e., create multiple configuration files based from a single configuration). In yet other examples, the virtual abstraction layer 112 may re-organize the configuration files and other components of the virtual template into a different packaging format, which can include such operations as the creation of one or more sub-directories, and changes to filenames (e.g., file extensions).

In an alternative aspect, the virtual abstraction layer 112 may retrieve one or more VM settings associated with the virtual template using an application programming interface (API), such as an API exposed by a VM management system (e.g., Parallels Remote Application Server, VMware vCenter®) for performing programmatic management of the VMs 120 on the servers 102. For example, the virtual abstraction layer 112 may submit a query for all VM settings specified for a particular virtual template, and use the returned results to formulate a native, destination configuration file that is compatible with the destination hypervisor.

In one aspect, the virtual abstraction layer 112 maintain a record or history log of the virtualization conversions previously performed. If the virtual abstraction layer 112 detects that the base VM image file 202 has been previously converted and transferred to the destination hypervisor, the virtual abstraction layer 112 may instead copy over only the disk difference between the VMs. That is, rather than transfer an entire copy of a converted virtual disk of the template 114, the virtual abstraction layer 112 may instead generate and transmit a disk difference between the VMs representing a difference between formats of the first VM type and the second VM type. This improves the efficiency and functioning of the VDI system 103 by reducing the amount of data needed to be handled by the CPU and transferred across the networks 115, 117. By way of example, a system administrator may seek to maintain all instances of the same template in a same state for future VM clones. Thus, installing an OS update on the original template may cause some differences in disk data which is reflected in a delta disk (in one implementation), that can be applied among all copied templates on all hypervisors.

In one aspect, the virtual abstraction layer 112 may be configured to manage virtual templates 114 on multiple, different hypervisors 122. In some aspects, the virtual abstraction layer 112 may transfer the converted VM image file from a source host to a destination host which is executing the destination hypervisor. In the example shown, the virtual abstraction layer 112 may transfer the VM-type-2 image file to the Data Center 2 to execute the second VM 204 on the destination hypervisor 206. In one "agentless" approach depicted in FIG. 2A, the virtual abstraction layer 112 may transmit the converted VM image file to the Data Center 2 using the management network 115. In this agentless approach, one or more VAL agents are not installed in data centers or on hosts. Rather, the VAL agents may be located on third-party servers (i.e., outside of the data centers) and have access to required APIs and network for transferring data between data centers and/or hosts.

In another approach, such as the agent-based approach depicted in FIG. 2B, the virtual abstraction layer 112 may be implemented in the form of multiple VAL agents (210A, 210B) that are installed in each data center, and the management network 115 and the data network 117 used between the VAL agents 210A, 210B may be used to transfer the converted VM image file to the destination (i.e., Data Center 2). In this case, there is a communication channel 211 between certain VAL agents 210A, 210B which are installed in Data Center 1 and Data Center 2, respectively (or on different hosts in the same DC). The VAL agents are communicating between each other and each of them could transfer a chunk of required data. In the aspect shown, VAL agent 210A is configured to handle VM-related operations that are compatible with a first VM type, for example, using Type1 Plug-in, that are known to be installed in Data Center 1, while the other VAL agent 210B is configured to handle VM-related operations of a different VM type (e.g., via Type2 Plug-in), that have been installed on Data Center 2. While FIG. 2B only depicts two VAL agents, it is understood that aspects of the present disclosure may use more VAL agents.

In fact, in some aspects, the VAL agents may form a peer-to-peer network which could advantageously increase file transfer speeds during conversion between VM types. For instance, in an example system in which there are three data centers/hosts, the system may transfer a chunk of a template VM (of a first VM type) from a first data center to a second data center, and then a third data center could simultaneously retrieve the chunk of template (of the first VM type) from both of these hosts simultaneously. In some aspects, a peer-to-peer network of VAL agents 210 may be configured to convert a virtual template of a first VM type to a second VM type in a distributed manner. A first VAL agent may divide the virtual template of a first VM type into pre-determined chunks and distribute the chunks to a destination VAL agent directly and/or indirectly via other intermediary VAL agents. Each chunk is apportioned to permit conversion of that chunk by a single node in the peer-to-peer network of VAL agents. For example, a first chunk of the virtual template may be comprised of configuration files of the VM template that an intermediary VAL agent can convert into a second VM type and pass to the destination VAL agent. Additional chunks of the virtual template may each be comprised a virtual machine disk state file (e.g., *.vhd or *.vmdk) of the virtual template. In this way, the VM conversion can be performed in a distributed and parallelized manner through the peer-to-peer network of VAL agents. For example, one peer VAL agent 210 can handle converting the configuration files (first chunk), a different peer VAL agent can concurrently handle converting one of the virtual machine disk state files, and another peer VAL agent can handle converting yet another virtual machine disk state files (which can have a substantial size on the order of gigabytes), all of which converted chunks are delivered to the destination VAL agent, which then reassembles the converted chunks into a completed VM image of the second VM type.

Figure 3:
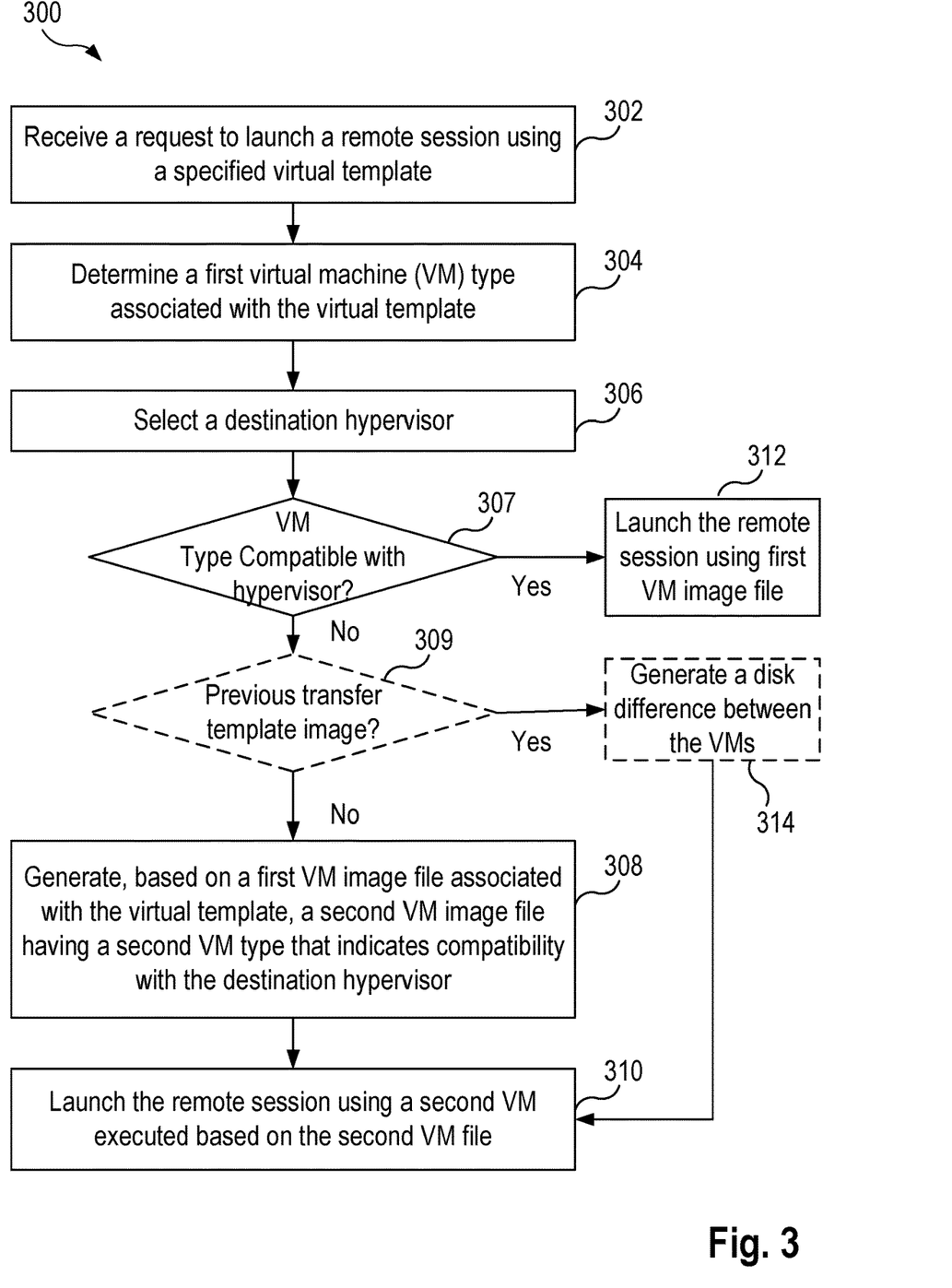
FIG. 3 is a flowchart illustrating a method for executing remote sessions in a virtualized environment according to an exemplary aspect.

FIG. 3 is a flowchart illustrating a method 300 for executing a remote session in a virtualized environment, according to an exemplary aspect. It is noted that the following description of the exemplary method makes reference to the system and components described above.

The method 300 begins at step 302, in which the virtual abstraction layer 112 receives a request to launch a remote session 108 using a specified virtual template 114. In some aspects, the virtual abstraction layer 112 may receive the request as relayed by the VDI agent 110 of the VDI system 103. By way of example, the received request may pertain to a user request (e.g., from user devices 104) to provide a virtual desktop on the user device 104, where the virtual desktop is implemented using a virtual machine executed in the VDI system 103.

At step 304, the virtual abstraction layer 112 may determine a first VM type or virtualization type associated with the virtual template. The first VM type indicates hypervisor compatibility of the virtual template, i.e., which types of hypervisors or what formats of hypervisors are capable of executing the native format of the virtual template.

At step 306, the virtual abstraction layer 112 may select a destination hypervisor 122 for executing the remote session 108. In one aspect, the selection of the destination hypervisor may be based on the selection of a particular host 102 on which the remote session should be executed.

At step 307, the virtual abstraction layer 112 determines whether the first VM type is compatible for execution with the selected destination hypervisor. In some aspects, the virtual abstraction layer 112 may determine that the first VM type is compatible for execution on the selected destination hypervisor based on a determination that the VM type of the destination hypervisor matches the determined first VM type pf the virtual template (e.g., both the template and the destination are of the OVF format). In other aspects, the virtual abstraction layer 112 may determine the execution compatibility using a pre-determined VM-compatibility table that indicates which virtualization types are compatible with which hypervisors. For example, the VM-compatibility table can specify that certain different hypervisors, although provided by different vendors, may nonetheless support a common virtualization type (such as OVF). In some aspects, the VM-compatibility table may include version information for both virtualization types and hypervisors so as to enable the virtual abstraction layer 112 to further distinguish whether a destination hypervisor (having a particular version) has execution compatibility with a first VM type. For example, a version 5.0 of the destination hypervisor does not support the given virtualization type, but version 6.0 of the destination hypervisor does. In another example, a given destination hypervisor may not support version 1.0 of a first VM type, but may support version 2.0 of the same VM type.

If so, at step 312 (i.e., responsive to determining that the determined first VM type is in fact compatible for execution on the destination hypervisor), then the virtual abstraction layer 112 may launch the requested remote session 108 using a VM that is based on the original native (first) VM image file. In some aspects, the virtual abstraction layer 112 may instantiate a new VM based on the first VM image file. In other cases, the virtual abstraction layer 112 may resume execution of an existing VM that is tied to the first VM image file.

Otherwise, at step 308 (i.e., responsive to determining that the determined first VM type is not compatible for execution on the destination hypervisor), the virtual abstraction layer 112 may generate, based on a first VM image file associated with the virtual template, a second VM image file having a second VM type that indicates compatibility with the destination hypervisor.

In some aspects, the virtual abstraction layer 112 may retrieve a first configuration file associated with the virtual template having the first VM type. This first configuration file may specify one or more VM settings for the virtual template. The virtual abstraction layer 112 may then generate, based on the first configuration file, a second configuration file that is compatible with the destination hypervisor.

The VM settings may be copied to and stored in the second configuration file in a format different than in the first configuration file.

In some aspects, the virtual abstraction layer 112 may retrieve, from a VM management system, one or more VM settings associated with the virtual template using an application programming interface (API). The virtual abstraction layer 112 may generate a destination configuration file that is compatible with the destination hypervisor using the one or more VM settings retrieved using the API.

At step 310, the virtual abstraction layer 112 may launch the remote session 108 using a second VM executed using the second VM image file. In some aspects, the virtual abstraction layer 112 may instantiate a new VM based on the second VM image file. In some aspects, the virtual abstraction layer 112 may transfer the second VM image file from a first host to a second host executing the destination hypervisor, wherein the second VM is executed based on the second VM image file. In some aspects, the virtual abstraction layer 112 may register the new configuration file and the second VM image file with the destination hypervisor.

In yet another aspect, as shown in optional step 309, the virtual abstraction layer 112 may check whether the first VM image file has been previously converted to the second VM type (and transferred to the second hypervisor). If so, at step 314 (i.e., responsive to determining that the first VM template image has been previously transferred), the virtual abstraction layer 112 may generate a disk difference between the VMs representing a difference, if any, between formats of the first VM type and the second VM type. In some aspects, the virtual abstraction layer 112 may distinguish between cases in which no copy is needed at all (if the virtual machine images are considered the same) and cases in which there is a difference between VM images. In the former case, the virtual abstraction layer 112 may use the prior-transferred second VM image if declared as a template corresponding to the first VM image file but of the second VM type. In the latter case, the virtual abstraction layer 112 may transmit virtual disk and configuration file differences only or the whole VM image. The virtual abstraction layer 112 may launch the remote session 108, on the destination hypervisor, using a second VM executed using a second VM image file which is derived from the combination of the prior-transferred VM image and the disk difference (e.g., using delta disk techniques).

Figure 4:
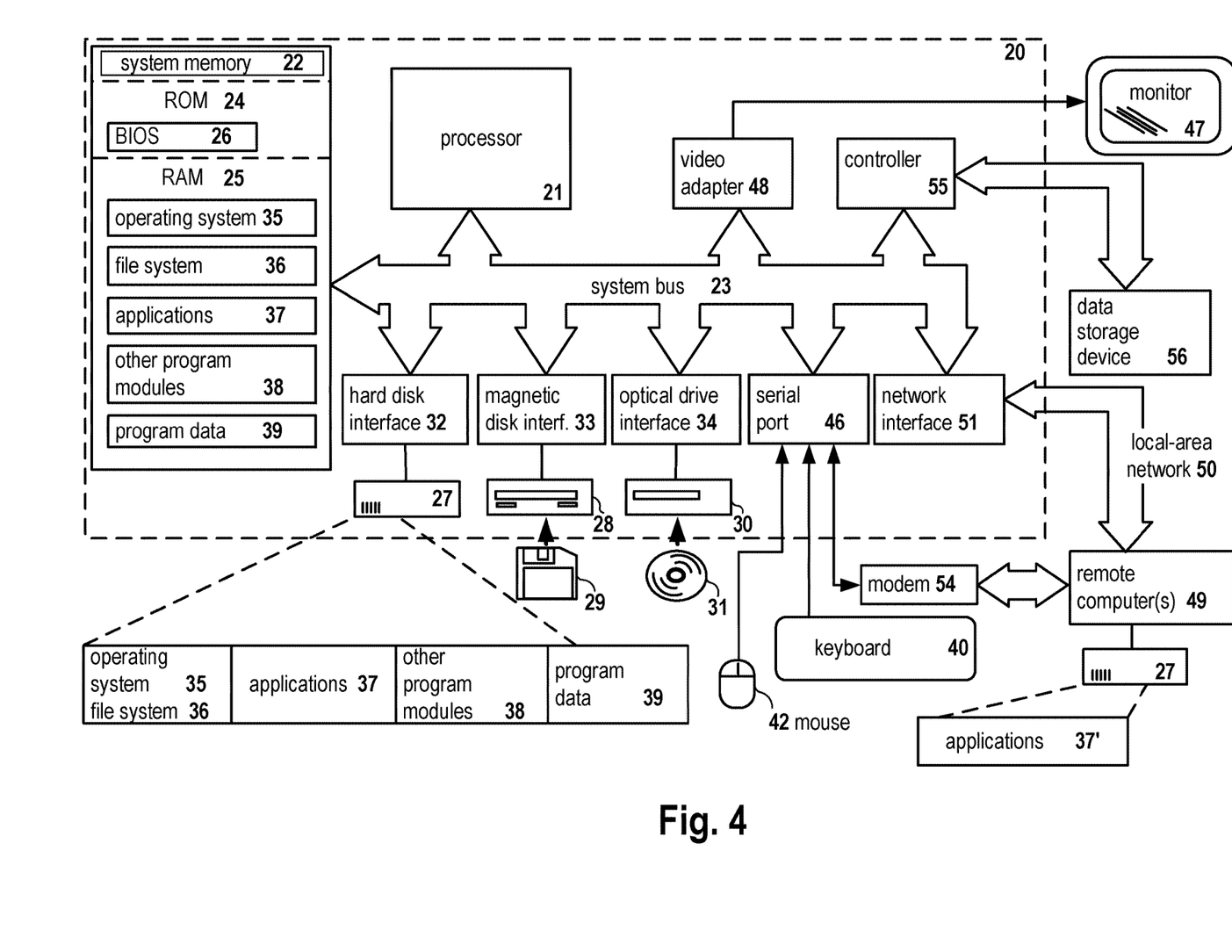
FIG. 4 is a block diagram of a computer system on which the disclosed system and method can be implemented according to an exemplary aspect.

FIG. 4 is a block diagram illustrating a computer system 20 on which aspects of systems and methods for executing a remote session in a virtualized environment may be implemented in accordance with an exemplary aspect. It should be noted that the computer system 20 can correspond to the client devices 104 and the physical servers 102, for example, described earlier.

As shown, the computer system 20 (which may be a personal computer or a server) includes a central processing unit 21, a system memory 22, and a system bus 23 connecting the various system components, including the memory associated with the central processing unit 21. As will be appreciated by those of ordinary skill in the art, the system bus 23 may comprise a bus memory or bus memory controller, a peripheral bus, and a local bus that is able to interact with any other bus architecture. The system memory may include permanent memory (ROM) 24 and random-access memory (RAM) 25. The basic input/output system (BIOS) 26 may store the basic procedures for transfer of information between elements of the computer system 20, such as those at the time of loading the operating system with the use of the ROM 24.

The computer system 20 may also comprise a hard disk 27 for reading and writing data, a magnetic disk drive 28 for reading and writing on removable magnetic disks 29, and an optical drive 30 for reading and writing removable optical disks 31, such as CD-ROM, DVD-ROM and other optical media. The hard disk 27, the magnetic disk drive 28, and the optical drive 30 are connected to the system bus 23 across the hard disk interface 32, the magnetic disk interface 33, and the optical drive interface 34, respectively. The drives and the corresponding computer information media are power-independent modules for storage of computer instructions, data structures, program modules, and other data of the computer system 20.

An exemplary aspect comprises a system that uses a hard disk 27, a removable magnetic disk 29 and a removable optical disk 31 connected to the system bus 23 via the controller 55. It will be understood by those of ordinary skill in the art that any type of media 56 that is able to store data in a form readable by a computer (solid state drives, flash memory cards, digital disks, random-access memory (RAM) and so on) may also be utilized.

The computer system 20 has a file system 36, in which the operating system 35 may be stored, as well as additional program applications 37, other program modules 38, and program data 39. A user of the computer system 20 may enter commands and information using keyboard 40, mouse 42, or any other input device known to those of ordinary skill in the art, such as, but not limited to, a microphone, joystick, game controller, scanner, etc. Such input devices typically plug into the computer system 20 through a serial port 46, which in turn is connected to the system bus, but those of ordinary skill in the art will appreciate that input devices may be also be connected in other ways, such as, without limitation, via a parallel port, a game port, or a universal serial bus (USB). A monitor 47 or other type of display device may also be connected to the system bus 23 across an interface, such as a video adapter 48. In addition to the monitor 47, the personal computer may be equipped with other peripheral output devices (not shown), such as loudspeakers, a printer, etc.

Computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes.

Network connections can form a local-area computer network (LAN) 50 and a wide-area computer network (WAN). Such networks are used in corporate computer networks and internal company networks, and they generally have access to the Internet. In LAN or WAN networks, the personal computer 20 is connected to the local-area network 50 across a network adapter or network interface 51. When networks are used, the computer system 20 may employ a modem 54 or other modules well known to those of ordinary skill in the art that enable communications with a wide-area computer network such as the Internet. The modem 54, which may be an internal or external device, may be connected to the system bus 23 by a serial port 46. It will be appreciated by those of ordinary skill in the art that said network connections are non-limiting examples of numerous well-understood ways of establishing a connection by one computer to another using communication modules.

In various aspects, the systems and methods described herein may be implemented in hardware, software, firmware, or any combination thereof. If implemented in software, the methods may be stored as one or more instructions or code on a non-transitory computer-readable medium. Computer-readable medium includes data storage. By way of example, and not limitation, such computer-readable medium can comprise RAM, ROM, EEPROM, CD-ROM, Flash memory or other types of electric, magnetic, or optical storage medium, or any other medium that can be used to carry or store desired program code in the form of instructions or data structures and that can be accessed by a processor of a general purpose computer.

In various aspects, the systems and methods described in the present disclosure can be addressed in terms of modules. The term "module" as used herein refers to a real-world device, component, or arrangement of components implemented using hardware, such as by an application specific integrated circuit (ASIC) or field-programmable gate array (FPGA), for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a general purpose computer (such as the one described in greater detail in FIG. 4, above). Accordingly, each module may be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

What is claimed is:

1. A computer-implemented method for executing a remote session in a virtualized environment, comprising:

receiving a request to launch a remote session using a specified virtual template associated with a first virtual machine (VM) image file;
determining a first VM type associated with the virtual template, wherein the first VM type indicates hypervisor compatibility of the virtual template;
selecting a destination hypervisor for executing the remote session;
determining whether the first VM type is compatible for execution on the destination hypervisor;
responsive to determining that the first VM type is not compatible for execution on the destination hypervisor, generating, based on the first VM image file associated with the virtual template, a second VM image file having a second VM type that indicates compatibility with the destination hypervisor;
launching the remote session using a second VM executed using the second VM image file; and
providing a virtual abstraction layer as part of a virtualization system providing the virtualized environment which generates the second VM image file from the first VM image file; wherein
the second VM image file is associated with another virtual template;
the first image file is a first configuration file;
the second image file is one or more second configuration files; and
the virtual abstraction layer creates the other virtual template from the virtual template with a different packaging format comprising one or more of creating one or more sub-directories, changing file extensions and generating the one or more second configuration files.

2. The method according to claim 1, wherein
determining the first VM type associated with the virtual template comprises reading a configuration file associated with the virtual template;
determining whether first VM type is compatible for execution on the destination hypervisor comprises identifying whether the first VM type is associated with the destination hypervisor within a virtual abstraction layer forming part of a virtualization system providing the remote session.

3. The method according to claim 1, further comprising
the first VM image file relates to a current remote session;
determining the first VM type associated with the virtual template comprises reading a configuration file associated with the virtual template;
determining whether first VM type is compatible for execution on the destination hypervisor comprises identifying whether the first VM type is associated with the destination hypervisor within a virtual abstraction layer forming part of a virtualization system providing the remote session; and
determining the first VM type and determining first VM type compatibility on the destination hypervisor are performed independent of the current remote session and dynamically determining the VM type.

4. The method according to claim 1, wherein
determining the first VM type associated with the virtual template comprises reading a configuration file associated with the virtual template; and
determining whether first VM type is compatible for execution on the destination hypervisor comprises identifying whether a compatibility table which comprises entries for a plurality of hypervisors and for each hypervisor of the plurality of hypervisors a list of compatible VM types includes an entry for the first VM type against the destination hypervisor;
the compatibility table is accessible to a virtualization system providing the remote session.

5. The method according to claim 1, further comprising the first VM image file relates to a current remote session;
determining the first VM type associated with the virtual template comprises reading a configuration file associated with the virtual template;
determining whether first VM type is compatible for execution on the destination hypervisor comprises identifying whether a compatibility table which comprises entries for a plurality of hypervisors and for each hypervisor of the plurality of hypervisors a list of compatible VM types includes an entry for the first VM type against the destination hypervisor;
the compatibility table is accessible to a virtualization system providing the remote session; and
determining the first VM type and determining first VM type compatibility on the destination hypervisor are performed independent of the current remote session and dynamically determining the VM type.

6. The method according to claim 1, wherein
selecting the destination hypervisor comprises determining which server of a plurality of servers support VMs and remote sessions has the most computing resources available for supporting the remote session; and
the second VM image file is generated by converting a configuration file associated with the virtual template associated with the first VM image file.

7. The method according to claim 1, wherein
selecting the destination hypervisor comprises selecting a server of a plurality of servers supporting VMs and remote sessions which has the most computing resources available for supporting the remote session; and
the second VM image file is generated by transmitting from a current server to the selected server of the plurality of servers associated with the destination hypervisor a configuration file associated with the virtual template associated with the first VM image file and converting the configuration file at the selected server of the plurality of servers.

8. The method according to claim 1, wherein
determining the first VM type associated with the virtual template comprises reading a configuration file associated with the virtual template;
determining whether first VM type is compatible for execution on the destination hypervisor comprises identifying whether the first VM type is associated with the destination hypervisor within a virtual abstraction layer forming part of a virtualization system providing the remote session; and
the configuration file stores data in an abstract manner allowing the data to be read by any hypervisor of a plurality of hypervisors.

9. The method according to claim 1, further comprising:
providing a virtual abstraction layer as part of a virtualization system providing the virtualized environment which generates the second VM image file from the first VM image file; wherein
the first image file is a first configuration file; and
the second image file is a plurality of second configuration files.

10. The method according to claim 1, wherein
the current first VM image file was established in dependence upon an update performed to the previously transferred first VM image file;
the previously transferred first VM image file was a template; and
the update was operating system update applied to a system employing the template.

11. The method according to claim 1, wherein
the virtual abstraction layer is implemented through a plurality of agents, each agent of the plurality agents forming part of a data center;
the plurality of agents form a peer-to-peer network; and either:
the second VM image file is transferred from a first agent of the plurality of agents to a second agent of the plurality of agents;
or:
data to generate the second VM image file from either a previously transferred VM image file or template is transferred from the first agent of the plurality of agents to the second agent of the plurality of agents.

12. The method according to claim 1, wherein
the virtual abstraction layer is implemented through a plurality of agents, each agent of the plurality agents forming part of a data center;
the plurality of agents form a peer-to-peer network; and either:
the second VM image file is generated in dependence upon portions of the second VM image file transferred to an agent of the plurality of agents from a subset of the plurality of agents;
or:
data to generate the second VM image file from either a previously transferred VM image file or template is transferred an agent of the plurality of agents from a subset of the plurality of agents.

13. The method according to claim 1, wherein
the virtual abstraction layer is implemented through a plurality of agents, each agent of the plurality agents forming part of a data center;
the plurality of agents form a peer-to-peer network; and either:
the second VM image file is generated in dependence upon portions of the second VM image file transferred to an agent of the plurality of agents from a subset of the plurality of agents where each agent of the subset of the plurality of agents generates a predetermined portion of the second VM image file;
or:
data to generate the second VM image file from either a previously transferred VM image file or template is transferred an agent of the plurality of agents from a subset of the plurality of agents where each agent of the subset of the plurality of agents generates a predetermined portion of the data.

14. A computer-implemented method for executing a remote session in a virtualized environment, comprising:
receiving a request to launch a remote session using a specified virtual template associated with a first virtual machine (VM) image file;
determining a first VM type associated with the virtual template, wherein the first VM type indicates hypervisor compatibility of the virtual template;
selecting a destination hypervisor for executing the remote session;
determining whether the first VM type is compatible for execution on the destination hypervisor;

responsive to determining that the first VM type is not compatible for execution on the destination hypervisor, generating, based on the first VM image file associated with the virtual template, a second VM image file having a second VM type that indicates compatibility with the destination hypervisor;

launching the remote session using a second VM executed using the second VM image file; and providing a virtual abstraction layer as part of a virtualization system providing the virtualized environment; wherein the virtual abstraction layer executes a process comprising:

determining whether the first VM image file has been previously transferred to the second VM type;

upon a positive determination of determining that the first VM image file had been previously converted generating a disk difference between the first VM type and the second VM type; and generating the VM second image file from the previously transferred first VM image file in dependence upon the disk difference.

15. A computer-implemented method for executing a remote session in a virtualized environment, comprising:

receiving a request to launch a remote session using a specified virtual template associated with a first virtual machine (VM) image file;

determining a first VM type associated with the virtual template, wherein the first VM type indicates hypervisor compatibility of the virtual template;

selecting a destination hypervisor for executing the remote session;

determining whether the first VM type is compatible for execution on the destination hypervisor;

responsive to determining that the first VM type is not compatible for execution on the destination hypervisor, generating, based on the first VM image file associated with the virtual template, a second VM image file having a second VM type that indicates compatibility with the destination hypervisor;

launching the remote session using a second VM executed using the second VM image file; and providing a virtual abstraction layer as part of a virtualization system providing the virtualized environment; wherein the virtual abstraction layer executes a process comprising:

determining whether the first VM image file has been previously transferred to the second VM type;

upon a positive determination of determining that the first VM image file had been previously converted:

generating a disk difference between the first VM type and the second VM type; and generating a configuration file difference between a configuration file of the first VM type and the second VM type; and generating the second VM image file from the previously transferred first VM image file in dependence upon the disk difference and the configuration file difference.

16. A computer-implemented method for executing a remote session in a virtualized environment, comprising:

receiving a request to launch a remote session using a specified virtual template associated with a first virtual machine (VM) image file;

determining a first VM type associated with the virtual template, wherein the first VM type indicates hypervisor compatibility of the virtual template;

selecting a destination hypervisor for executing the remote session;

determining whether the first VM type is compatible for execution on the destination hypervisor;

responsive to determining that the first VM type is not compatible for execution on the destination hypervisor, generating, based on the first VM image file associated with the virtual template, a second VM image file having a second VM type that indicates compatibility with the destination hypervisor;

launching the remote session using a second VM executed using the second VM image file; and providing a virtual abstraction layer as part of a virtualization system providing the virtualized environment; wherein the virtual abstraction layer executes a process comprising:

determining whether the first VM image file has been previously transferred to the second VM type;

upon a positive determination of determining that the first VM image file had been previously converted determining whether a previously generated second VM image file generated from the previously transferred first VM image file has been declared a template;

upon a positive determination that the previously transferred first VM image file was declared a template generating a disk difference between the first VM type and the second VM type; and generating a configuration file difference between a configuration file of the first VM type and the second VM type; and generating the second VM image file from the previously transferred first VM image file in dependence upon the disk difference and the configuration file difference.

17. A computer-implemented method for executing a remote session in a virtualized environment, comprising:

receiving a request to launch a remote session using a specified virtual template associated with a first virtual machine (VM) image file;

determining a first VM type associated with the virtual template, wherein the first VM type indicates hypervisor compatibility of the virtual template;

selecting a destination hypervisor for executing the remote session;

determining whether the first VM type is compatible for execution on the destination hypervisor;

responsive to determining that the first VM type is not compatible for execution on the destination hypervisor, generating, based on the first VM image file associated with the virtual template, a second VM image file having a second VM type that indicates compatibility with the destination hypervisor;

launching the remote session using a second VM executed using the second VM image file; and providing a virtual abstraction layer as part of a virtualization system providing the virtualized environment; wherein the virtual abstraction layer executes a process comprising:

determining whether the first VM image file has been previously transferred to the second VM type;

upon a positive determination of determining that the first VM image file had been previously converted determining whether a previously generated second VM image file generated from the previously transferred first VM image file has been declared a template;

upon a positive determination that the previously transferred first VM image file was declared a template:

generating a disk difference between the first VM type and the second VM type; and generating a configuration file difference between a configuration file of the first VM type and the second VM type; and generating the second VM image file from the previously transferred first VM image file in dependence upon the disk difference and the configuration file difference; and upon a negative determination that the previously transferred first VM image file was declared a template:

generating the second VM image file by converting the first VM image file.

18. The method according to claim 17, wherein the current first VM image file was established in dependence upon an update performed to the previously transferred first VM image file;

the previously transferred first VM image file was a template; and the update was operating system update applied to a system employing the template.

19. A computer-implemented method for executing a remote session in a virtualized environment, comprising:

receiving a request to launch a remote session using a specified virtual template associated with a first virtual machine (VM) image file;

determining a first VM type associated with the virtual template, wherein the first VM type indicates hypervisor compatibility of the virtual template;

selecting a destination hypervisor for executing the remote session;

determining whether the first VM type is compatible for execution on the destination hypervisor;

responsive to determining that the first VM type is not compatible for execution on the destination hypervisor, generating, based on the first VM image file associated with the virtual template, a second VM image file having a second VM type that indicates compatibility with the destination hypervisor;

launching the remote session using a second VM executed using the second VM image file; and providing a virtual abstraction layer as part of a virtualization system providing the virtualized environment; wherein the virtual abstraction layer executes a process comprising:

determining whether the first VM image file has been previously transferred to the second VM type;

upon a positive determination of determining that the first VM image file had been previously converted determining whether a previously generated second VM image file generated from the previously transferred first VM image file has been declared a template;

upon a positive determination that the previously transferred first VM image file was declared a template:

generating a delta configuration by:

generating a disk difference between the first VM type and the second VM type; and generating a configuration file difference between a configuration file of the first VM type and the second VM type; and applying the delta configuration to a plurality of second VM image files on a plurality of servers independent of each hypervisor associated with each second VM image file of the plurality of second VM image files.

* * * * *